Patented May 5, 1936

UNITED STATES PATENT OFFICE 2,039,434

ALKALINE EARTH METAL SALTS OF 2,4,5-TRICHLOROPHENOL

Lindley E. Mills, Midland, Mich., assignor to The Dow Chemical Company, Midland, Mich., a corporation of Michigan No Drawing. Original application May 2, 1932, Serial No. 608,855. Divided and this application October 12, 1934, Serial No. 748,082

3 Claims. (Cl. 260—154)

The present invention regards a new class of compounds, namely,—the alkaline earth metal 2,4,5-trichlorophenolates. The said phenolates, so far as I am aware, have not been previously prepared and/or isolated, nor have the properties thereof been described.

I have now prepared the aforementioned compounds, determined certain physical properties thereof whereby they may readily be identified, and have discovered that they may advantageously be used as fungicides, antiseptics, preservatives, etc. To the accomplishment of the foregoing and related ends, the invention, then, consists of the new products hereinafter fully described and particularly pointed out in the claims, the following description setting forth in detail several of the various ways in which the principle of the invention may be realized.

I have found that the phenolates of 2,4,5-trichlorophenol can be formed with the alkaline earth metals, i. e. calcium, strontium, and barium. The method which I generally employ for the preparation of the aforementioned phenolates comprises effecting a double decomposition of a soluble salt of the alkaline earth metal with an alkali metal 2,4,5-trichlorophenolate, in aqueous solution.

In carrying out the foregoing method for the preparation of the alkaline earth metal 2,4,5-trichlorophenolates, the compounds are obtained directly by crystallization in a hydrated form. The hydrates may readily be hydrated to the anhydrous compound, as by heating them to a temperature between 40° and 60° C. or slightly higher at atmospheric pressure, or by drying in vacuo over sulphuric acid or calcium chloride at room temperature. The compounds are white crystalline substances which do not melt but decompose at varying temperatures upon heating. The compounds are partially decomposed in aqueous solution by carbon dioxide with the formation of the alkaline earth metal carbonates and trichlorophenol.

The structural formula of the alkaline earth metal 2,4,5-trichlorophenolates is:

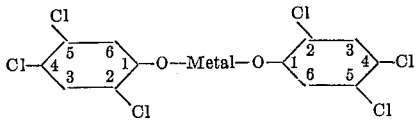

In the following examples the preparation of specific alkaline earth metal trichlorophenolates, namely, the barium and calcium, 2,4,5-trichlorophenolates is described.

*Example 1—Barium 2,4,5-trichlorophenolate*

I have prepared hydrated barium 2,4,5-trichlorophenolate by heating a mixture consisting of 19.75 grams (0.1 mol) of 2,4,5-trichlorophenol, 15.75 grams (0.05 mol) of barium hydroxide octahydrate and 6 grams of water, at a temperature between 70° and 80° C., with agitation. The reaction product was allowed to cool, after which it was granulated. The yield of hydrated barium 2,4,5-trichlorophenolate was 97 per cent of that theoretically obtainable. The anhydrous barium 2,4,5-trichlorophenolate, obtained by drying the hydrated compound over calcium chloride, is a white substance which is moderately soluble in cold water and very soluble in hot water. In aqueous solution it is decomposed by carbon dioxide with the formation of barium carbonate and 2,4,5-trichlorophenol.

*Example 2—Calcium 2,4,5-trichlorophenolate*

23.65 grams (0.1 mol) of anhydrous sodium 2,4,5-trichlorophenolate was dissolved in 114.8 grams of water, and to this solution was added 5.5 grams (0.05 mol) of calcium chloride dissolved in 50 grams of water. The mixture was agitated for about 15 minutes and then filtered to separate solid hydrated calcium, 2,4,5-trichlorophenolate from the NaCl mother liquor, after which the precipitate was dried over calcium chloride. The yield of calcium 2,4,5,-trichlorophenolate was 90 per cent of the theoretical amount obtainable from the quantity of reactants employed. The compound is a white crystalline solid which is only slightly soluble in cold water. In hot water it partially hydrolyzes and is decomposed by carbon dioxide.

Upon analysis, the theoretical percentage of alkaline earth metal was found in each of the foregoing described phenolates, and the correct amount of 2,4,5-trichlorophenol obtained in each case by acidifying the said phenolates and boiling the acid solution.

The aqueous solutions of the hereinbefore mentioned class of new compounds may be more advantageously used as fungicides, etc., than free trichlorophenol, because of their lesser tendency to vaporize than the free phenol.

This application is a division of United States Patent application Serial Number 608,855.

Other modes of applying the principle of my invention may be employed instead of the one explained, change being made as regards the compound herein disclosed, provided the step or steps stated by any of the following claims or the equivalent of such stated step or steps be employed.

I therefore particularly point out and distinctly claim as my invention:—

1. An alkaline earth metal 2,4,5-trichlorophenolate.
2. Calcium 2,4,5-trichlorophenolate.
3. Barium 2,4,5-trichlorophenolate.

LINDLEY E. MILLS.